F. LORIMER.
MUD GUARD FOR MOTOR VEHICLES.
APPLICATION FILED DEC. 8, 1917.
1,303,567.
Patented May 13, 1919.
2 SHEETS—SHEET 1.
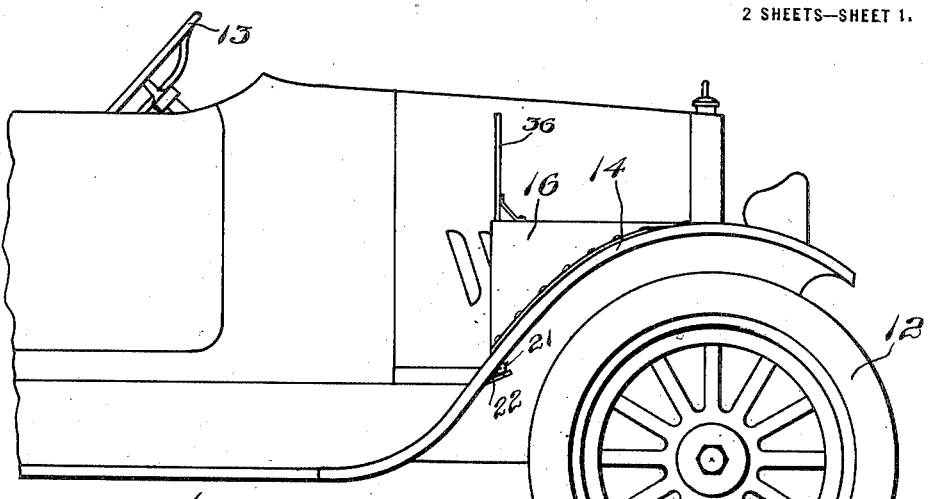
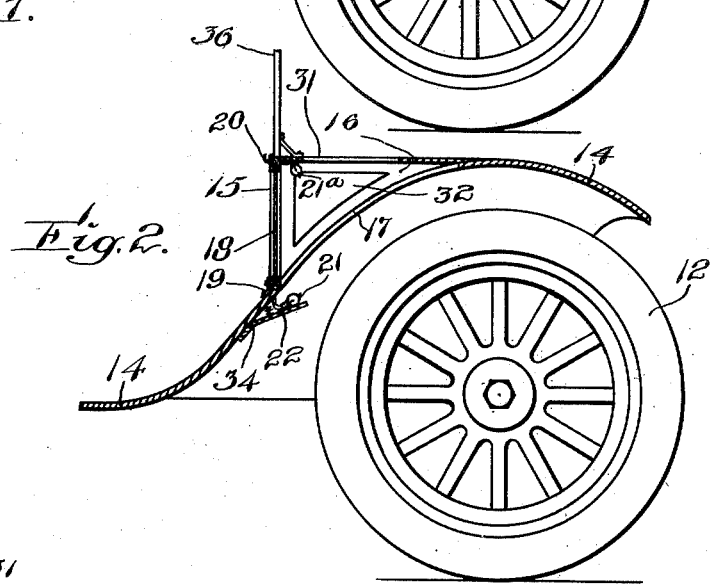
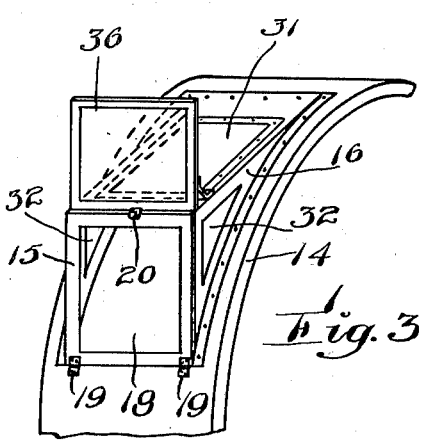
Inventor:
Felix Lorimer,
By Knight Brown Quinby May
Attorneys.

F. LORIMER.
MUD GUARD FOR MOTOR VEHICLES.
APPLICATION FILED DEC. 8, 1917.
1,303,567.
Patented May 13, 1919.
2 SHEETS—SHEET 2.
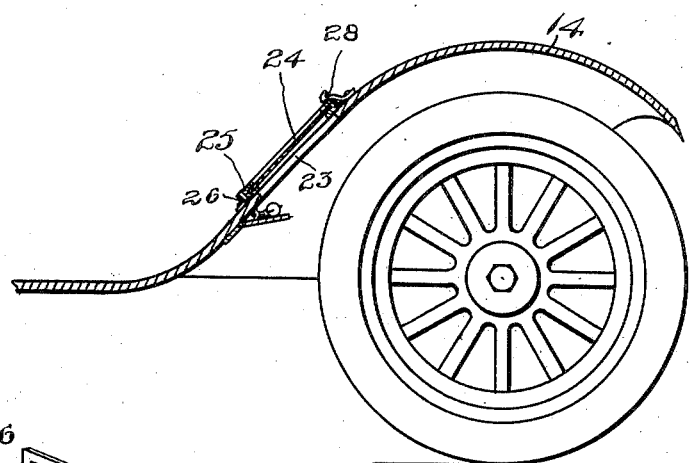
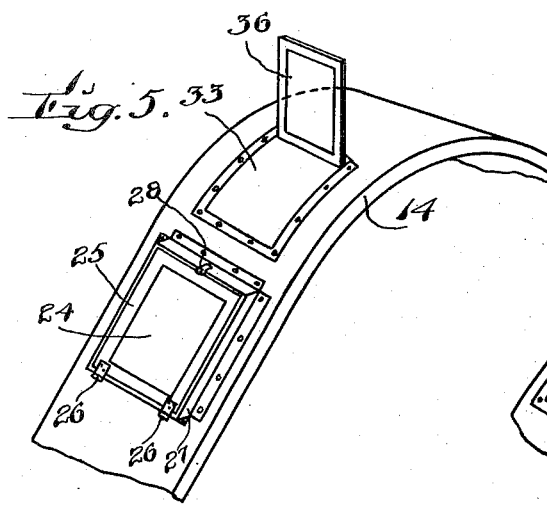
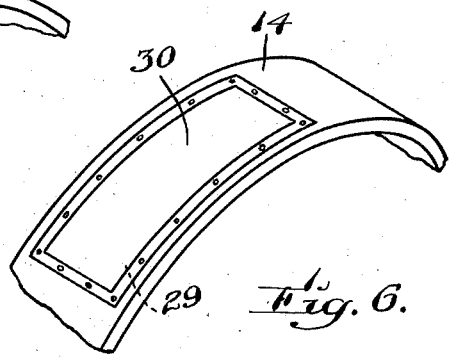
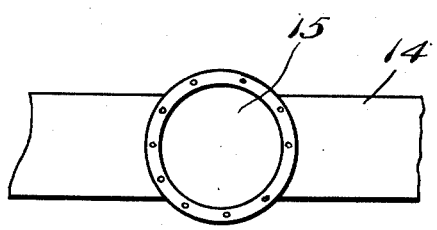
Inventor:
Felix Lorimer,
By Hughes Brown [?]
Attorneys.

UNITED STATES PATENT OFFICE.

FELIX LORIMER, OF BOSTON, MASSACHUSETTS.

MUD-GUARD FOR MOTOR-VEHICLES.

1,303,567.          Specification of Letters Patent.     Patented May 13, 1919.

Application filed December 8, 1917. Serial No. 206,288.

*To all whom it may concern:*

Be it known that I, FELIX LORIMER, a citizen of the United States, residing at Boston, in the county of Suffolk and State of Massachusetts, have invented new and useful Improvements in Mud-Guards for Motor-Vehicles, of which the following is a specification.

This invention has for its object to enable the chauffeur of a motor vehicle, while in position to control the hand wheel, to observe a sufficient portion of one of the steering wheels of the vehicle, and thus determine before starting the vehicle, the angularity of the steering wheels relatively to the front axle, this knowledge being important in many cases, as is well known by motor vehicle operators.

The invention is embodied in the improvements hereinafter described and claimed relating to a mud guard for a motor vehicle steering wheel adapted to permit an occupant of the vehicle to see a sufficient portion of the steering wheel under said guard, and thus determine the angularity of the steering wheel, and of the other steering wheel, which of course, corresponds in position with the one which is visible.

Of the accompanying drawings forming a part of this specification,—

Figure 1 is a side view of a portion of a motor vehicle, having a mud guard embodying the invention.

Fig. 2 is a view similar to Fig. 1, of a mud guard, shown in longitudinal section.

Fig. 3 is a perspective view of a portion of the mud guard shown by Figs. 1 and 2.

Fig. 4 is a view similar to Fig. 2, showing a somewhat different embodiment of the invention.

Fig. 5 is a perspective view of a portion of the mud guard shown by Fig. 4.

Fig. 6 is a view similar to Fig. 5, showing a modification.

Fig. 7 is a plan view of a portion of the mud guard showing another modification.

The same reference characters indicate the same parts in all of the figures.

In the drawings, 12 represents one of the steering wheels of a motor vehicle, and 13 the hand wheel of the steering mechanism.

14 represents a mud guard, located over the steering wheel 12.

The mud guard 14 is provided with a sight opening located in the line of vision, from the eyes of an operator seated in the vehicle, to a portion of the steering wheel 12. It may be assumed that the operator will incline his body outward or over one side of the vehicle body, for the purpose of viewing the steering wheel while seated in position to manipulate the hand wheel.

In the embodiment of the invention shown by Figs. 1, 2, and 3, the sight opening is in a substantially vertical plane, and is bounded by a frame 15, the sight opening being virtually a window standing vertically in a projection 16 built out to receive it from a sloping portion of the mud guard 14. The projection 16 and frame 15, therefore, form a structure analogous to a dormer window, the portion of the mud guard within and under said structure being cut away to form an opening 17, which is virtually a part of the sight opening, the opening bounded by the frame 15, and the opening 17 being in the line of vision of an operator looking from the vehicle toward the steering wheel 12.

The opening bounded by the frame 15 is preferably provided with a continuous transparent cover 18, which may be a pane of any suitable transparent, or relatively transparent material, such as mica, glass, celluloid, or gelatin. The frame 15 and the transparent cover are displaceable, to permit the exposure of the inner side of the cover for cleaning. As here shown, the frame 15 is connected at one end by hinges 19 with a portion of the mud guard, its opposite end being detachably secured by a suitable catch 20, to maintain the cover in its operative position.

I prefer to provide means for illuminating the visible portion of the steering wheel, or that portion which is seen by the operator through the sight opening. To this end I preferably employ an incandescent electric lamp 21, located adjacent to the sight opening, and preferably secured to the mud guard in substantially the location indicated by Fig. 2, said lamp being adapted to illuminate the upper portion of the wheel 12.

To prevent mud thrown upwardly by the wheel 12 from reaching the sight opening, I provide an intercepting guard 22 projecting from the mud guard toward the periphery of the steering wheel and normally out of contact with the latter. The guard 22 is in the path of mud thrown upwardly by the wheel 12, toward the sight opening. When the lamp 21 is provided, the guard 22 is located below the lamp, as shown by Fig. 2, to prevent mud from reaching the lamp.

In the embodiment of the invention shown by Figs. 4 and 5 a sloping portion of the mud guard 14 is provided with a sight opening 23, which is covered by a transparent plane 24, held by a frame 25 suitably secured to the mud guard. As here shown, the frame 25 is connected at one end by hinges 26 with an outer frame or casing 27 attached to the mud guard, and surrounding the sight opening 23, the opposite end of the frame 25 being detachably connected with said casing by a catch 28.

As shown by Fig. 6, a sight opening 29 may be provided, occupying the major portion of that part of the mud guard which is located over and adjacent to the steering wheel, said sight opening being provided with a transparent cover 30 which conforms to the general shape of the mud guard. In this embodiment of the invention, the mud guard may be said to include a marginal frame portion of suitable strength and rigidity and necessarily opaque, and a light-transmitting portion formed by the cover 30.

The mud guard may be provided with a window adjacent to the sight opening to admit daylight to the portion of the wheel that is seen through the sight opening. In Fig. 3 I show windows 31, 32, in the top and sides of the projection 16. In Fig. 5 I show a window 33. Said windows may be provided with transparent covers or panes. It is obvious that the mud guard may be provided with a magnifying lens in its sight opening. A plurality or group of sight openings may be provided, each of relatively small area, the group being arranged so that the operator may see a portion of the wheel through each opening. Each of said openings may be provided with a magnifying lens. The projection 16 may be provided with a lamp 21ª, as shown by Fig. 2.

The deflecting lip or flange 22 may be hinged to the mud guard at 34 (Fig. 2), so that it may yield or swing upwardly, in case it is caused by abnormal movements of the body, to strike the wheel.

The portion of the mud guard containing the sight opening may be enlarged or widened, as shown by Fig. 7. The mud guard may be provided with a mirror 36 (Fig. 5) arranged adjacent to any suitable opening, to permit the operator to see above the mud guard, a reflected image of a portion of the wheel. Said mirror may also be arranged to show or reflect objects behind the vehicle. The mirror may be located on the projection 16, above the sight opening therein.

I claim:

1. A motor vehicle of the character described comprising a mud guard located over the steering wheel of the vehicle and having a sight opening to permit the occupant of the vehicle to see a portion of said steering wheel, a hinged transparent cover for said opening attached to said mud guard, and means for releasably securing said cover in its closed position over said opening.

2. In a motor vehicle, a mud guard located over a steering wheel and having a sight opening arranged to permit an occupant of the vehicle to see a portion of said wheel, a transparent cover for said opening hinged to the mud guard, means for releasably securing the cover over said opening, and means independent of the sight opening for effecting illumination of said wheel.

3. In a motor vehicle, a mud guard located over a steering wheel and having a sight opening arranged to permit an occupant of the vehicle to see a portion of the steering wheel, and a continuous transparent cover for said opening, the mud guard being provided with a window for the admission of daylight to the portion of the steering wheel which is visible through said opening, and with a lamp whereby said wheel portion may be artificially illuminated.

4. In a motor vehicle, a mud guard located over a steering wheel and having a sight opening arranged to permit an occupant of the vehicle to see a portion of the steering wheel, a transparent cover for said opening, and an intercepting guard projecting from the under surface of the mud guard toward the periphery of the steering wheel and normally out of contact with the latter, said intercepting guard being in the path of mud thrown upwardly by the wheel toward the sight opening.

5. In a motor vehicle, a mud guard located over a steering wheel and having a sight opening arranged to permit an occupant of the vehicle to see a portion of the steering wheel, a transparent cover for said opening, and an intercepting guard projecting from the under surface of the mud guard toward the periphery of the steering wheel and normally out of contact with the latter, said intercepting guard being in the path of mud thrown upwardly by the wheel toward the sight opening, and hinged to the mud guard to yield, in case the intercepting guard is brought by abnormal movement of the mud guard into contact with the wheel.

6. In a motor vehicle, a mud guard located over a steering wheel and having a sight opening arranged to permit an occupant of the vehicle to see a portion of the steering wheel, a lamp whereby said portion may be illuminated, and an intercepting guard projecting from the under surface of the mud guard toward the periphery of the steering wheel and out of contact with the latter, said intercepting guard being in the path of mud thrown upwardly by the wheel toward the sight opening and lamp.

7. A mud guard for a motor vehicle steering wheel, having a dormer-like projection provided with a rearwardly facing sight opening arranged to permit an occupant of the vehicle to see a portion of the steering wheel under said guard.

In testimony whereof I affix my signature.

FELIX LORIMER.